United States Patent [19]

Margolin et al.

[11] Patent Number: 4,842,363
[45] Date of Patent: Jun. 27, 1989

[54] FIBER OPTIC CONNECTOR, TOOL FOR ASSEMBLING FIBER OPTIC CONNECTOR AND METHOD OF ASSEMBLING FIBER OPTIC CONNECTORS

[75] Inventors: Mark Margolin; Igor Grois, both of Lincolnwood; James E. Moore, Wheaton, all of

[73] Assignee: Amphenol Corporation, Wallingford, Conn.

[21] Appl. No.: 131,435

[22] Filed: Dec. 11, 1987

Related U.S. Application Data

[63] Continuation of Ser. No. 892,976, Aug. 4, 1986, abandoned.

[51] Int. Cl.$^4$ .............................................. G02B 6/36
[52] U.S. Cl. ............................... 350/96.21; 350/96.20
[58] Field of Search ................ 350/96.20, 96.21, 96.22

[56] References Cited

U.S. PATENT DOCUMENTS 4,392,713  7/1983  Piter et al. ...................... 350/96.21
4,444,461  4/1984  Wey et al. ....................... 350/96.21

FOREIGN PATENT DOCUMENTS 0043585  1/1982  European Pat. Off. .
De. 3319690  6/1984  Fed. Rep. of Germany .
8600423  1/1988  World Int. Prop. O. ....... 350/96.21

OTHER PUBLICATIONS

J.E.E. Journal of Electronic Engineering, vol. 20, No. 200, Aug. 1983, pp. 52–53, "More Precise Connection Needed for Fiber Optic Cable", T. Matsumoto.

Primary Examiner—William L. Sikes
Assistant Examiner—Akm E. Ullah
Attorney, Agent, or Firm—Bacon & Thomas

[57] ABSTRACT

This invention relates to an improvement in a fiber optic connector of the type having a main body to which is secured a ceramic ferrule. The improvement resides in that the mating ferrule is a ceramic ferrule arranged in a press-fit engagement within the recess such that the ferrule does not abut against the bottom of the recess and extends beyond the main body a fixed predetermined distance to be compatible for mating with other like connectors. The requirement for using epoxy to fix the ferrule to the body and later polishing down of the ferrule is eliminated. The invention also resides in a tool for assembling the fiber optic connector and the method of using the tool to assemble the connector.

6 Claims, 2 Drawing Sheets

FIBER OPTIC CONNECTOR, TOOL FOR ASSEMBLING FIBER OPTIC CONNECTOR AND METHOD OF ASSEMBLING FIBER OPTIC CONNECTORS

This application is a continuation, of application Ser. No. 892,976, filed Aug. 4, 1986 now abandoned.

BACKGROUND OF THE INVENTION

This invention relates to an improved fiber optic connector of simple structure having low connection losses when employed with fiber optic cable. The invention also relates to a tool for assembly such a fiber optic connector and a method of using the tool to assemble the connector. More specifically, this invention relates to such a connector for use with both single and multi-mode fibers, but the preferred embodiment finds special use with multi-mode fiber optic cables resulting in a very low loss connector of the type generally known as an SMA ceramic ferrule connector.

The use of optical fibers as a means for transmitting optical signals in the field of optical communications has been known for many years. When employed in such systems, it is necessary to interconnect different fibers within the system to complete the communications link. However, in such connections it is often found that not only are there transmission losses when the light is transmitted through the optical fibers, but extensive transmission losses also result from the actual fiber connections themselves. In order to eliminate or minimize such interconnection losses, fiber alignment must be achieved with accuracy on the order of microns, and at the same time the fibers have to closely abut in a manner such as to not damage the cleaved or polished fiber ends.

One prior approach to centering fibers or wave guides within aligned connectors is disclosed in U.S. Pat. No. 4,440,469 to Schumaker. The device of Schumaker is an SMA-style optical waveguide connector, the type to which this invention is directed, and includes a tubular contact body having an axial passageway profiled for receiving a primary ferrule therein. The passageway is further profiled for retaining the primary ferrule at a rearward location, which ferrule receives an optical waveguide therethrough with a forward end segment of the waveguide extending forward from a forward end of the contact body. An alignment ferrule is provided and is mounted over the forward end of the contact body and received on a forward segment of the optical waveguide. The forward end of the primary ferrule and the inner profile of the contact body passageway are structured to interfit and define a region wherein adhesive material is inserted from the forward terminal end of the connector assembly. The adhesive is retained within this region by the alignment ferrule which fits over the forward segment of the optical waveguide.

Although intially aligning the fiber precisely, as the adhesive sets, some shrinkage of the adhesive occurs in the device of Schumaker, and it is not possible to achieve fine fiber alignment readily and reliably with such an arrangement. Moreover, the use of the adhesive complicates the assembly operation and requires long setting times and often, due to the setting of the adhesive, even if misalignment does not occur, changes in temperature will cause shrinkage or expansion of the adhesive ultimately resulting in creation of a gap and in the fiber ends being moved out of abutment with each other.

An alternative approach to solving these problems is disclosed in U.S. Pat. No. 4,487,474 which teaches the use of a pair of ceramic optical plugs having optical fibers extending coaxially therethrough which fit within a ceramic sleeve. A coupling nut serves to hold the two plugs together to effect the interconnection between the optical fibers. Although generally providing improved results over the adhesive employing prior art system described above, the connector of said patent includes disadvantages in that it is difficult to ensure that the two ceramic plugs are tightly held against each other.

One advantageous embodiment of a connector which avoids the above-discussed disadvantages is disclosed in copending U.S. Application Ser. No. 766,743 which was filed Aug. 16, 1985, and which has inventors in common with those of this application. The connector described therein is generally satisfactory but it is complicated in construction and it is preferred for use with single mode fibers where the question of losses become even more critical than when multi-mode fibers are concerned.

A more preferred SMA type connector is described in a product brochure by Ofti dated Nov. 28, 1984 discussing epoxy style-SMA ceramic series FO connectors. The connector described therein comprises typically a main body having a coupling nut attached thereto and in the front a ceramic ferrule receiving recess. In such connector the cable is mounted within the connector in a conventional manner. The fiber is passed through a ceramic ferrule at the end, which ferrule is epoxied to the main housing in the recess, with the fiber being epoxied within the ferrule. The tip of the fiber extending from the ferrule is cut to a point where it extends beyond the end of the connector. Thereafter, the ceramic and the fiber are conventially ground and polished down in size to a desired length for both the ceramic as well as the fiber. While providing satisfactory results generally for use with both multi-mode and single mode fibers, the assembly of such a connector is difficult and further, ensuring the proper length for the ceramic also becomes difficult since it is a time consuming process and always not possible to maintain tolerances in the manufacture of the main metal body, and thereafter in the polishing operation, since variations in polishing techniques will affect the end face of the ceramic either in that it will be too short, too long or the end face will at an angle thereby creating an angular misalignment situation with respect to fibers being interconnected.

It is thus according to the invention that such a ceramic type connector is provided which is of simple construction and it is easily repeatable in terms of construction to provide connectors having extremely low losses.

SUMMARY OF THE INVENTION

In accordance with the invention, there is provided an improvement in a fiber optic connector of the type comprising a main body having a longitudinal passage extending therethrough, and having two ends. A first end serves for attaching a fiber optic cable thereto and a second end serves for having a mating ferrule secured thereto. The passage opens at each end and is coextensive with a passage extending through the ferrule. The second end is comprised of a recess in which is secured the mating ferrule and the mating ferrule is constructed for having the fiber of the fiber optic cable extending in a passage therethrough, secured therein and terminating at the end of the ferrule. The improvement resides in that the mating ferrule is a ceramic ferrule arranged in press-fit engagement within the recess. The press-fit engagement is such that the ferrule does not abut against the bottom of the recess and extends beyond the main body a fixed predetermined distance to be compatible for mating with other like connectors. In accordance with this improvement, the requirement for using epoxy to fix the ferrule to the body and later polishing down of the ferrule to achieve the predetermined length of the ferrule is avoided.

In another aspect, the invention resides in providing a tool for assembling a fiber optic connector of the above-discussed type with a ceramic ferrule. The tool comprises a first body member having a passage extending therethrough configured for supporting the connector main body in a manner such that the ferrule receiving end extends beyond the end of the first body member a predetermined distance. A second body member is receivable in part within the passage opening at one end in the first body member and having a passage including a first portion in which is received the end of the connector main body extending from the first body member. The first portion of the passage is of a length such that the end of the connector main body terminates at a location adjacent the end of the first portion of the passage. The first portion of the passage is coextensive with a second portion of the passage which opens at the other end of the second body member. The second portion is of a size sufficient to permit a ceramic ferrule to be inserted therethrough and the second body member is of predetermined length such that when assembled with the first body member and a connector main body, a ferrule can be inserted therethrough from the other end and into press-fit engagement in the connector main body recess without abutting with the connector body recess bottom. When pressed in in this matter, the ferrule is flush at the end with the end of the second body member and extends from the connector main body by a predetermined desired amount. Press means is also provided for pressing the ferrule into press-fit engagement with the connector main body in a manner such that the end of the ferrule terminates flush with the other end of the second body member.

In sill another aspect, the invention resides in a method of assembling the above-type connector by employing the tool of the invention, and comprises mounting a main body of a connector within the passage opening of the first body member of the tool, mounting the second body member over the main body of the connector and partly within the passage of the first body member of the tool. A ceramic ferrule is inserted at the free end of the second body member through the second portion of the passage thereof, and press means is employed to force ferrule into engagement with the recess of the connector main body to a point wherein the end of the ferrule is flushed with the free end of the second body member.

BRIEF DESCRIPTION OF THE DRAWINGS

A more complete understanding of the foregoing and other features and advantages of the present invention can be obtained from the following detailed description taken in conjunction with the accompanying drawings in which.

DETAILED DISCUSSION OF THE INVENTION

Figure 1:
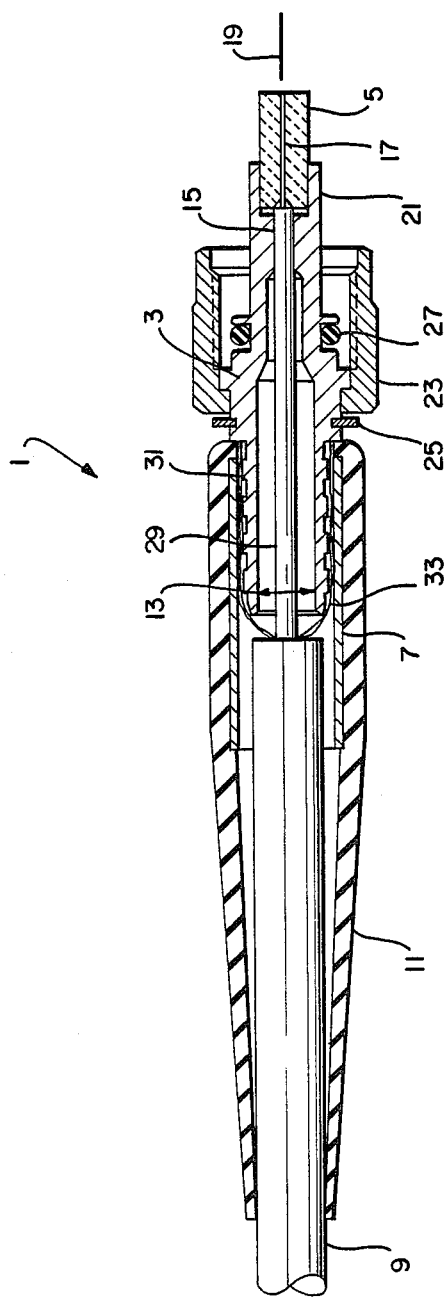
FIG. 1 is a side cross-sectional view of the connector in accordance with the invention showing all the parts thereof.

In FIG. 1 there is shown an improved connector in accordance with the invention. The connector 1 comprises a main body 3 typically made of metal or other like material as will be readily apparent to those of ordinary skill in the art. The main body includes a first passage portion 13 of a predetermined width which progessively tapers down towards the mating end of the connector and opens into a recess containing end 21. The recess of the recess containing end 21 is sufficiently small that a ceramic ferrule 5 is received therein in press-fit engagement, i.e. the interior diameter thereof is equal to or slightly less than that of the ceramic ferrule. The ceramic ferrule 5 is inserted into the recess portion 21 only a predetermined distance so that it projects therefrom a desired amount.

In practice, the connector 1 also includes a locking nut 23 which engages threads of a sleeve which mutually interconnects two like connectors. The locking nut 23 is received on the main connector body 3 and retained therein by a snap-lock ring 25. O-ring 27 serves to maintain a tight and clean construction when the sleeve which serves to align two connectors is received and engaged by the threaded lock nut 23. As shown in the drawing a fiber 17 stripped of its buffer layer is received and terminated flush with the end of the ferrule 5 by cutting off the excess portion 19 which projects therefrom. The fiber is held therein by means of epoxy. The buffer covered fiber 15 extends within the connector housing and the cable is secured to the connector housing by fanning out the strength layer 33, typically Kevlar TM fibers over the outer rear surface 31 of the connector body which includes ridges as more clearly shown in FIGS. 2 and 3. A crimp sleeve 7 is received over the fibers and crimped thereon to retain the fiber optic cable 9 connected to the connector 1. A rubber or other like elastomeric material boot 11 serves to relieve tension on cable correction to the connector.

Figure 2:
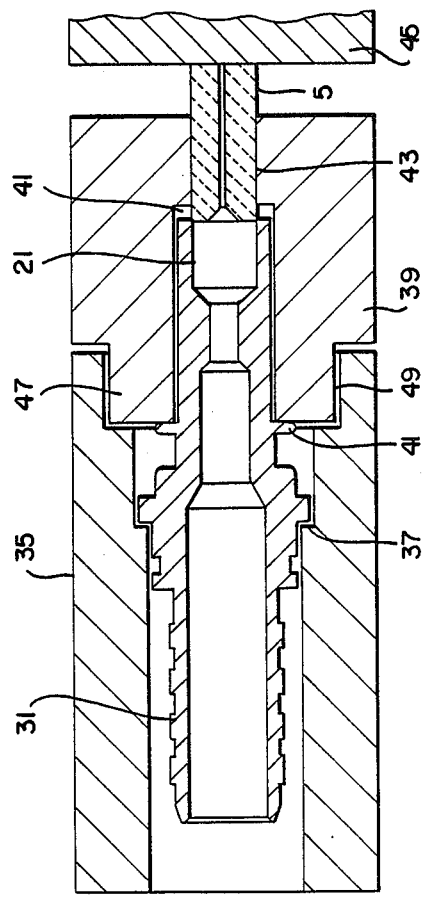
FIGS. 2 and 3 are side cross-sectional views of the tool of the invention shown with a connector to be assembled therein and showing the steps of assembly in accordance with the method of the invention.
Figure 3:
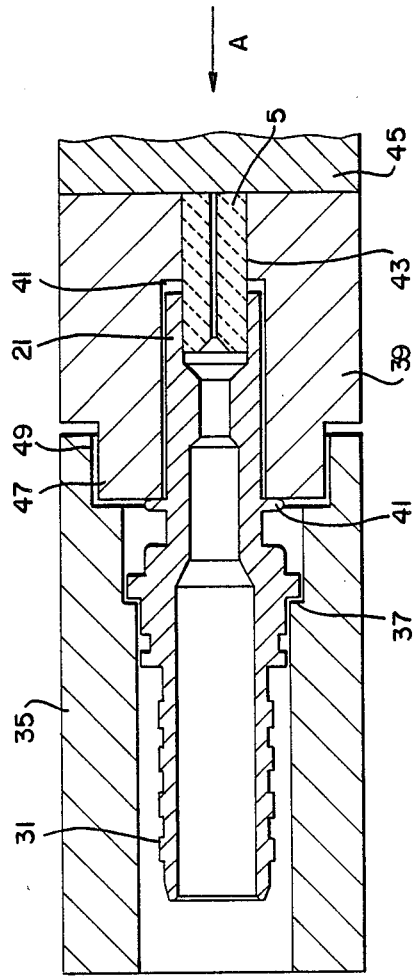

The tool and method of assembly of the connector in accordance with the invention is shown in FIGS. 2 and 3. The main connector body 3 is received within a first body member 35 having a longitudinal passage extending therethrough. The connector body 3 is in abutment at a portion 37 within said housing 35 such that the recess end 21 projects a predetermined amount from the front end of the first housing 35. A second housing 39 is received within the first housing 35. Projections 47 and 49 abut against a like projection 41 of the connector so that the forward end of the connector body 3 extends a predetermined distant into the second housing 39. Accordingly, the housing 39 is sized such that when a ceramic ferrule 5 is inserted through an appropriately sized passage way 43 thereinto, when the ferrule 5 is pressed to be flush with the end of the housing 39, the distance from projection 41 on the connector body 3 to the end of the ferrule 5 projecting beyond the end of the connector body 3 will have been predetermined and fixed for ease of repeatable assembly by sizing the second housing 39. This insures that even if the dimensions of connector body 3 and/or ferrule 5 exceed normal tolerances, the distance between projection 41 of the connector body 3 and the projecting end of the ferrule will not be affected. For example, if ferrule 5 is longer than normal, it will simply penetrate deeper into the recess in passage 21 and maintain the distance between projection 41 and the projecting end of the ferrule of the same predetermined dimension. Thus, regardless of errors in the tolerances of the connector body and ferrule, the ferrule will extend beyond the connector body a distance which is compatible for mating with other like connectors, without the need for polishing down the ferrule to adjust its length. A press member 45 serves to be forced in the direction of arrow A as shown in FIG. 3 to arrive at the predetermined distance such that the ferrule 5 which is of slightly greater diameter than the recess in passage 21 is engaged by the connector body 3 in press-sit engagement.

EXAMPLE

A connector in accordance with above-described embodiment was assembled. The connector body was stainless steel with the ferrule of ceramic material. A fiber optic cable was terminated with the connector by conventional crimping and epoxying of the fiber within the ferrule. The end of the fiber was polished by conventional polishing transmission of light through the connector to another connector was conducted. dB losses were measured and did not exceed 0.2 dB.

Various modifications of the invention described illustratively hereinabove will be realized by those skilled in the art without departing from the scope of the invention as defined by the appended claims.

What is claimed is:

1. In a fiber optic connector of the type comprising a main body having a longitudinal passage extending therethrough and having two ends, a first end for attaching a fiber optic cable thereto and a second end for having a mating ferrule secured thereto, and said passage opening at each end and being coextensive with a passage extending through said ferrule, said second end being comprised of a recess having a forward and rearward end in which is secured said mating ferrule, and said mating ferrule being constructed having the fiber of said fiber optic cable extending in a passage therethrough secured therein and terminating at the end of said ferrule, the improvement wherein said mating ferrule is a ceramic ferrule arranged in press-fit engagement within said recess, said press-fit engagement being such that said ferrule does not abut against the rearward end of said recess and extends beyond said forward end of said recess a distance compatible for mating with other like connectors whereby the requirement for using epoxy to fix said ferrule to said body and later polishing down of said ferrule to achieve said distance is eliminated.

2. A connector as in claim 1 wherein said main body is made of metal.

3. A connector as in claim 1 wherein said recess has a diameter of a size equal to or slightly less than that of the ferrule.

4. A tool for assembling a fiber optic connector of the type comprising a main body having a longitudinal passage extending therethrough, and having two ends, a first end for attaching a fiber optic cable thereto and a second end for having a mating ceramic ferrule secured thereto, and said passage opening at each end and being coextensive with a passageway extending through said ferrule, said second end comprising a recess having a forward and rearward end in which is to be secured said mating ferrule, and of such a size that said mating ferrule is to be secured by press-fit engagement, said main body having a radially outwardly extending projection, the tool comprising:

a first body member having a passage extending therethrough and configured for supporting said connector main body in a manner such that the ferrule receiving end extends beyond the end of the first body member;

a second body member receivable in part within the passage opening at one end in said first body member, and having a passage including a first portion in which is received the end of said connector main body extending from said first body member, said first portion of said passage being of a length such that the end of said connector main body terminates at a location adjacent the end of said first portion of said passage, said first portion being coextensive with a second portion of said passage which opens at the other end of the second body member and said second portion being of a size sufficient to permit a ferrule to be inserted therethrough, and said second body member being of predetermined length, such that when assembled with said first body member and a connector main body, a ferrule can be inserted therethrough from the other end into press-fit engagement in said connector main body recess without abutting with the connector body recess rearward end and such that when said ferrule is flush at the end with the end of said second boy member, the distance from the end of the ferrule which is flush with the end of the second body member to the radially outwardly extending projection on the main body corresponds to the length of the second body member such that the ferrule extends from said connector main body by a desired amount so as to be compatible for mating with other like connectors; and press means for pressing said ferrule into press-fit engagement with said connector main body in a manner such that the end of the ferrule terminates flush with said other end of said second body member.

5. The tool as in claim 4, wherein said second body member abuts against said radially outwardly extending projection on said connector main body where it is received within the passage opening at one end in said first body member.

6. A method of assembling an optical fiber connector having a connector main body and a ceramic ferrite press-fit therein comprising:

inserting into a first body member a connector main body having a longitudinal passage extending therethrough and having two ends, a first end for attaching a fiber optic cable thereto and a second end for having a mating ceramic ferrule secured thereto, said passage opening at each end and being coextensive with a passageway extending through said ferrule, said second end comprising a recess having a forward and rearward end, for receiving said mating ferrule in press-fit engagement, said connector main body having a radially outwardly extending projection, said first body member having a passage extending therethrough and configured for supporting said connector main body in a manner such that the ferrule receiving end extends beyond the first body member.

inserting a second body member into the passage opening at one end in said first body member, said second body member having a passage including a first portion in which is received the end of said connector main body extending from said first body member, said first portion of said passage being of a length such that the end of said connector main body terminates at a location adjacent the end of said first portion of said passage, said first portion being coextensive with a second portion of said passage which opens at the other end of the second body member and said second portion being of a size sufficient to permit a ferrule to be inserted therethrough, and said second body member being of predetermined length, inserting a ferrule into said second portion of said passage, and pressing said ferrule into press-fit engagement with said connector main body until the end of the ferrule terminates flush with said other end of said second body member.

* * * * *

UNITED STATES PATENT AND TRADEMARK OFFICE
CERTIFICATE OF CORRECTION

PATENT NO. : 4,842,363

DATED : June 27, 1989

INVENTOR(S) : Mark MARGOLIN et al.

It is certified that error appears in the above-identified patent and that said Letters Patent is hereby corrected as shown below:

Col. 1, line 14, change "assembly" to --assembling--;

Col. 2, line 49, after "will" insert --be--;

Col. 3, line 40, delete "in", second occurrence; and change "matter," to --manner--;

Col.3, line 48, change "sill" to --still--;

Col. 3, line 58, after "force" insert --the--;

Col. 6, line 32, change "boy" to --body--; and

Col. 6, line 51, change "ferrite" to --ferrule--.

Signed and Sealed this

Twenty-third Day of July, 1991

Attest:

HARRY F. MANBECK, JR.

*Attesting Officer*  *Commissioner of Patents and Trademarks*